(12) United States Patent
Medawar

(10) Patent No.: US 10,538,189 B2
(45) Date of Patent: Jan. 21, 2020

(54) WEIGHT TRANSFER APPARATUS

(71) Applicant: Samuel C. Medawar, Lansing, MI (US)

(72) Inventor: Samuel C. Medawar, Lansing, MI (US)

(*) Notice: Subject to any disclaimer, the term of this patent is extended or adjusted under 35 U.S.C. 154(b) by 0 days.

(21) Appl. No.: 16/031,521

(22) Filed: Jul. 10, 2018

(65) Prior Publication Data

US 2019/0039496 A1 Feb. 7, 2019

Related U.S. Application Data

(60) Provisional application No. 62/540,330, filed on Aug. 2, 2017.

(51) Int. Cl.
*B60P 1/54* (2006.01)
*B66C 17/06* (2006.01)

(52) U.S. Cl.
CPC ........... *B60P 1/5442* (2013.01); *B60P 1/5438* (2013.01); *B66C 17/06* (2013.01)

(58) Field of Classification Search
CPC ............................ B60P 1/5442; B60P 1/5409
USPC ......................................................... 414/542
See application file for complete search history.

(56) References Cited

U.S. PATENT DOCUMENTS

| | | | | |
|---|---|---|---|---|
| 3,463,334 A * | 8/1969 | Blakely | ..................... | B64C 1/22 212/73 |
| 4,297,071 A * | 10/1981 | Dunbar | .................. | B60P 1/5442 212/74 |
| 4,642,018 A * | 2/1987 | Leroux | ..................... | B65G 1/06 414/267 |
| 5,743,702 A * | 4/1998 | Gunderson | ........... | B60P 1/5442 224/403 |
| 6,126,379 A * | 10/2000 | Feldman | ............... | B60P 1/5442 254/4 R |
| 7,048,491 B2 * | 5/2006 | Windbergs | ............... | B66C 9/08 212/312 |
| 7,413,394 B2 * | 8/2008 | Risser | ................... | B60P 1/5442 212/74 |
| 7,748,943 B2 * | 7/2010 | Studer | ................... | B60P 1/4435 414/542 |
| 8,322,967 B2 * | 12/2012 | Owens | .................. | B60P 1/5404 414/348 |
| 8,534,980 B2 * | 9/2013 | Kuramoto | ............. | B60P 1/5409 212/180 |
| 2014/0314532 A1 * | 10/2014 | Alexander | ............ | B60P 1/5409 414/542 |

* cited by examiner

*Primary Examiner* — Jonathan Snelting
(74) *Attorney, Agent, or Firm* — The Weintraub Group, P.L.C.

(57) ABSTRACT

A weight transfer apparatus for use in combination with a vehicle includes a hoist bar connected to a pair of spaced-apart frames. The hoist bar being responsive to actuation of a motor to vertically to be removable between a downward position and upward into a retracted position. The structure further includes a pair of opposed frame members including longitudinally extending beams. The assembly further includes means for moving the rectangular frame member between a retracted position entirely in the vehicle and an extended position partially outside of the vehicle.

4 Claims, 4 Drawing Sheets

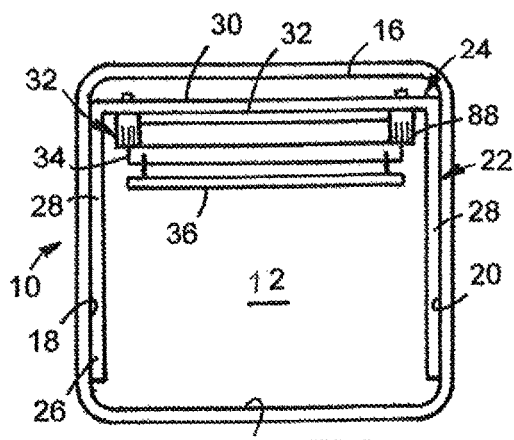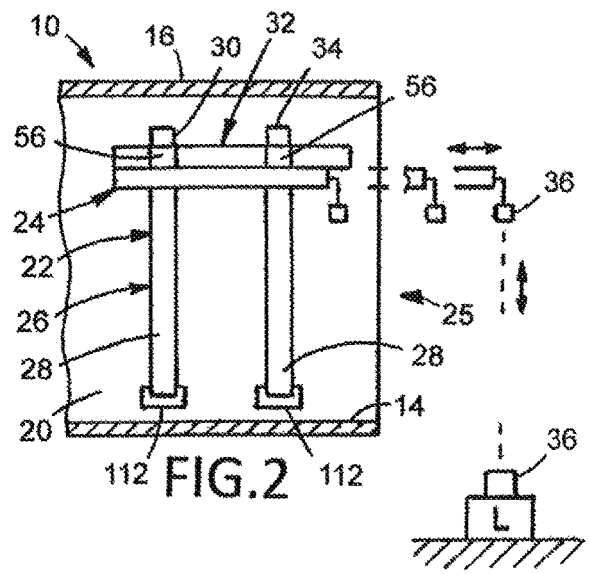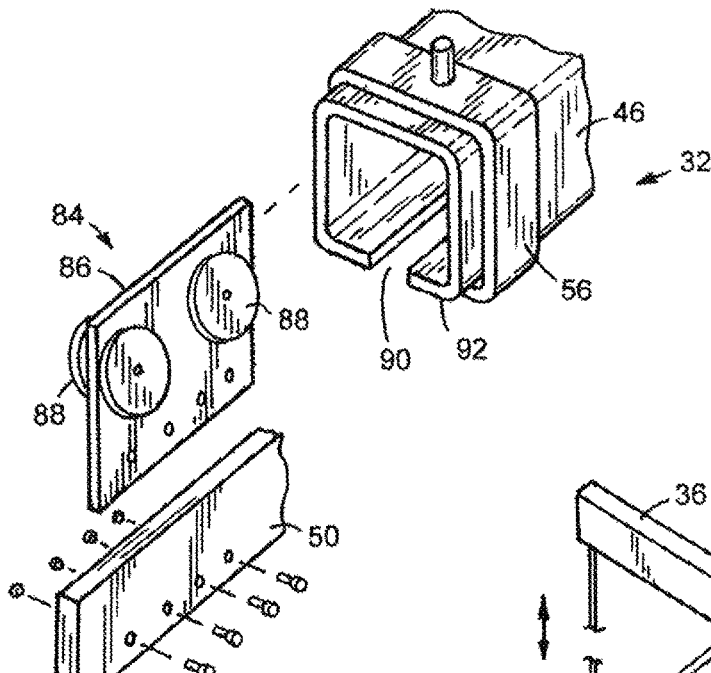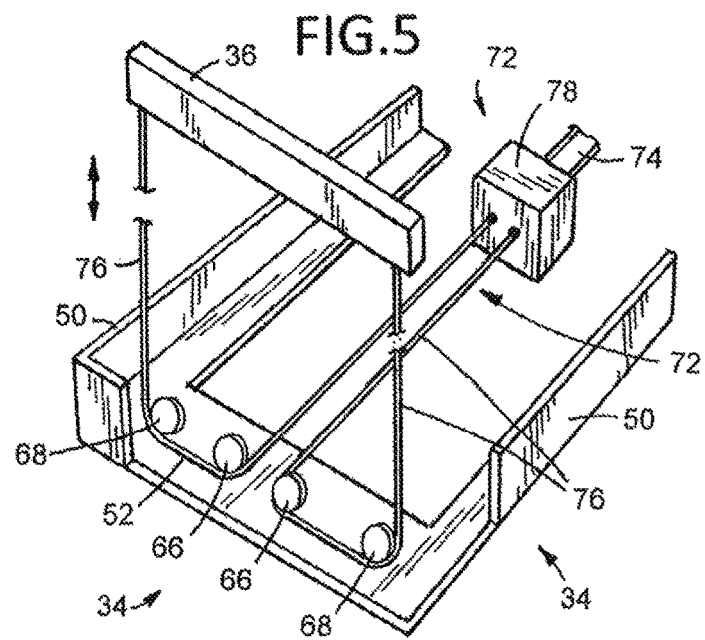

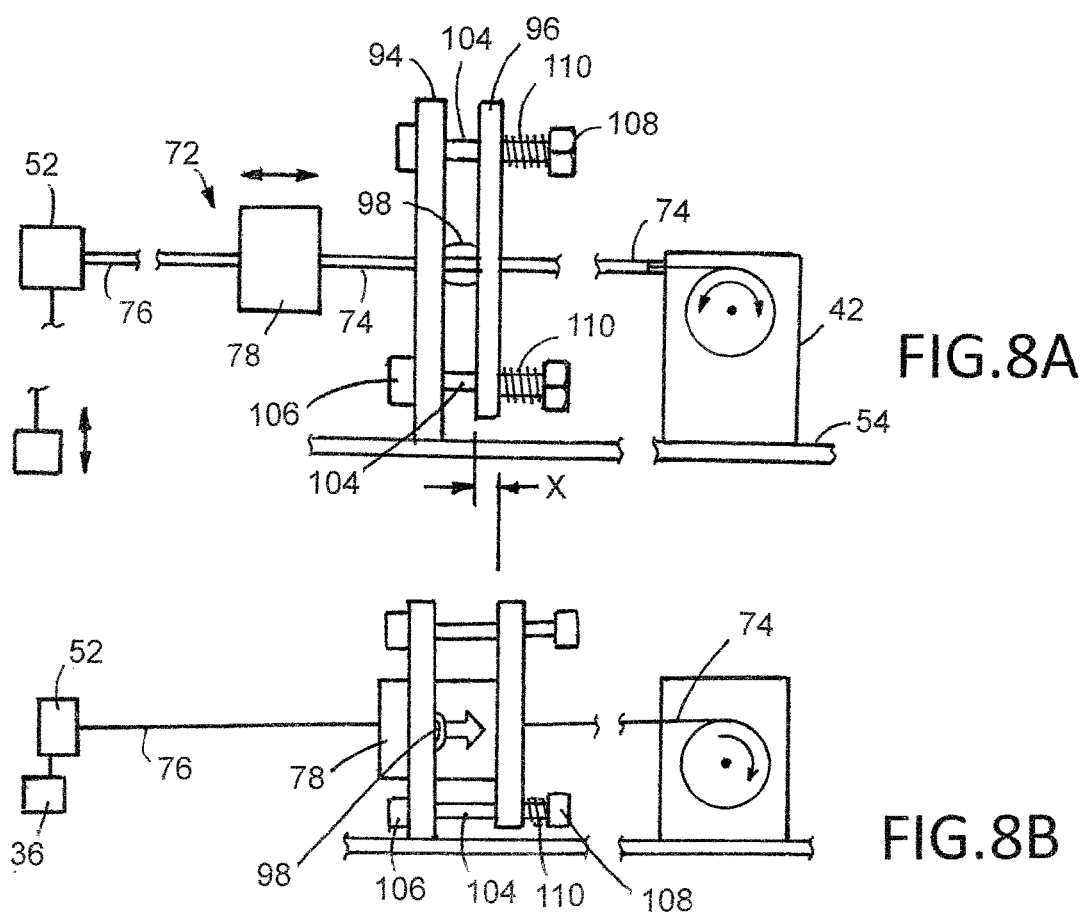

WEIGHT TRANSFER APPARATUS

CROSS-REFERENCE TO RELATED APPLICATIONS

This application is a completion application of U.S. Provisional Patent Application Ser. No. 62/540,330, filed Aug. 2, 2017, for "Weight Transfer Apparatus" the disclosure of which is hereby incorporated by reference in its entirety including the drawing.

BACKGROUND OF THE INVENTION

1. Field of the Invention

The present invention pertains to a weight transfer apparatus for providing a means of loading and unloading weights from a cargo receiver such as a standard vehicle. More particularly, this invention relates to a slide out hoist apparatus adapted to compactly fit within and lift and lower weights into and from the cargo receiver.

2. Description of the Prior Art

Today in many locales there is a need for smaller vehicles for transporting various cargo and thus cost-effective lifting and hoisting apparatus. Oftentimes, smaller companies are finding cost effective ways to retrofit small cargo vans with hoists and thus avoid more costly approaches.

Weight transfer apparatus for use with standard vehicles is known, such as illustrated by U.S. Pat. No. 3,463,334 to C. F. Blakely et al.; U.S. Pat. No. 4,297,071 to Dunbar; U.S. Pat. No. 4,642,018 to Leroux et al.; U.S. Pat. No. 7,048,491 to Windbergs; and U.S. Pat. Nos. 7,748,943; 8,534,980; and U.S. Patent Publication No. 2014/0314532 to Alexander.

The devices and arrangements disclosed in the above listed publications are identified herein in recognition of the duty of disclosure of related subject matter, which may be relevant under 37 CFR 1.56.

OBJECTS OF THE INVENTION

Additionally, the above references may have a disadvantage in that they are complicated, or costly, limited as to use inside a specific truck or van.

An object according to this invention is provision of a hoist apparatus that is inexpensive and is capable of being interfitted compactly into a variety of trucks or vans.

Another object of this invention is provision of a weight lifting apparatus which is space efficient and allows optimum use of a cargo compartment.

Another object of this invention is provision of a winch operated hoist apparatus and method for use in loading and unloading cargo within the interior of a cargo enclosure.

Another object of the invention herein is provision of a hoist apparatus that may be marketed as a kit or used, for example, in combination with more than one specific vehicle, or used outside of a van and adapted to be mounted to a standalone support frame to load cargo onto or from trains, flatbeds or other devices.

Advantageously, the hoist apparatus according to the invention although fully automated and controlled by actuator motors may in a less expensive configuration be hand operated.

It is to be appreciated that there is a need for an efficient low cost hoist apparatus.

SUMMARY OF THE INVENTION

According to this invention, there is provided a slide-out and lift means for use in combination with a cargo transport vehicle, such as van, having inner walls and a support structure conforming to and fixedly attached to the inner walls of the vehicle, comprising the following elements, (a) a pair of longitudinally extending first beams fixedly connected to the support structure, (b) a rectangular shaped frame member including a pair of longitudinally extending second beams slidably connected to respective of the first beams for longitudinal relative movement thereto, (c) means for moving the rectangular frame member between a retracted position entirely in the vehicle and an extended position, in part, outwardly of the van, (d) a hoist bar, (e) a linkage for moving the hoist bar in opposite longitudinal directions, respectively, for raising and lowering the hoist bar relative to the frame member, and (f) limit means for limiting the rearward retraction of the hoist bar relative to the frame member.

Desirably, the slide-out and lift means comprises an electric motor actuator fixedly mounted at a rearward end of the frame member, the linkage including a disabler block and connecting the motor to the hoist bar for retracting the hoist bar depending on the motor actuation, and the limit means for limiting the rearward retraction of the hoist bar into the van comprises an electrical limit switch fixedly mounted proximate to the motor and in electrical connection therewith, a plate mounted for movement between positions normally engaged with and disengaged with the limit switch, the motor being operable in the engaged position and inoperable in the disengaged position, the disabler block being adapted to be retracted into engagement with the plate and push the plate to the disengaged position.

In a preferred embodiment, the limit means comprises first and second plates in spaced facing relation and an electrical limit switch disposed between and mounted to one of the plates and electrically connected to the motor, the first plate fixed to an end wall of the frame member and distal to the motor, the second plate mounted for movement to and away from the first plate, means for normally biasing the second plate towards the first plate and the switch into engagement with the other plate, the motor operating when the switch is engaged and disabled when the switch is not engaged, and the disabler block connected to the linkage, a retracting rearward pull by the motor on the linkage pulling the disabler block rearward and into engagement with the second plate, driving the second plate from the first plate and engagement of the switch, and causing the motor to turn off the load bar to stop at the opposite end of the frame.

Broadly and according to this invention there is provided, in combination, a large or small transport vehicle or van having an interior for transporting packages or other items, a support frame adapted to be fixedly secured to the interior side walls of the van, and a hoist apparatus adapted to be secured to the support frame, the hoist apparatus including a frame element that is adapted to partially extend from and retract into the van, and a load lifting arrangement including a hoist bar, an electric actuator motor, a linkage connecting the hoist bar to the motor, actuation of the motor in one and the other direction, respectively, allowing the linkage to unwind from the motor and extend or be retracted and wound, in part, onto the motor, and means for limiting rearward retraction of the linkage whereby the load bar is disposed at the forward end of the frame element.

A method of loading and unloading a van type of vehicle comprising the steps of: providing a large or small van having a rear compartment for containing packages, placing plural U-shaped supports in the van transport area with legs thereof against opposite side walls thereof and a cross bar extending between the legs proximate the roof of the rear compartment, providing two longitudinally extending beams each connected to the respective cross bars proximate the side walls, each of said beams having a longitudinal slot formed in the bottom thereof, wherein each of said beams has at least two sets of longitudinally separated roller assemblies mounted therein, a slidable rectangular shaped lower frame connected to the roller assemblies for sliding movement relative to the beams, providing that the slidable tube has a hoist mounted thereon, moving the slidable lower frame to a van outer position by means of an electronic actuator, lowering and raising the hoist to pick up a load L, moving the slidable lower frame back into the van and lowering the hoist to deposit the load into the van transport area, and providing a limit switch arrangement wherein the actuator will limit retraction of the hoist to a location juxtaposed with the forward end of the lower frame.

Further and according to this invention, a method of use of the hoist apparatus includes providing a stationary support of a shape and configuration as shown herein, attaching a hoist apparatus to the support, including an upper frame fixedly connected to the support, a lower frame connected to the upper frame for sliding movement thereto and including a hoist bar mounted thereon for picking up and lowering a load depending on whether the load bar is extended or retracted, providing first and second electric actuator motors, respectively, for selectively moving the lower frame in opposite directions and moving the hoist bar up for retraction and down for extension, connecting the load bar to the respective motor by a linkage, and providing means for limiting the upward retracting movement of the hoist bar to a location juxtaposed with the extendable end of the lower frame.

The present invention will be more clearly understood with reference to the accompanying drawings and to the following Detailed Description, in which like reference numerals refer to like parts and where:

BRIEF DESCRIPTION OF THE DRAWINGS

FIG. 1 is a rear elevation view looking into the interior of a van provided with a support frame fixedly connected to the side walls of the van and a hoist apparatus mounted to the support frame;

FIG. 2 is a side elevation view of the van interior of FIG. 1 illustrating several spaced apart vertical support beams of the support frame connected to a sidewall of the van and the hoist apparatus including upper and lower frame elements with the upper frame element fixedly connected to the support frame and the lower frame element slidably connected to the upper frame element and provided with a load bar, the lower frame element shown being moved from a retracted position and entirely in the van and an extended position wherein a forward end portion thereof and the load bar are outwardly of the van and the load bar is shown moving vertically downwardly from the lower frame element to a cargo element or load L;

FIGS. 4A and 4B are schematic end views showing the rolling connection of the lower frame element to the upper frame element;

FIG. 5 is a schematic view looking at the bottom side of the forward end of the lower frame element, a pulley system, the load bar, and wires directed through the pulleys to connecting the load bar to the lower frame;

FIGS. 8A and 8B are side elevation schematic views of the arrangement for limiting retracting movement of the load bar, wherein FIG. 8A shows the load bar capable of moving in loading and unloading directions and FIG. 8B shows the drive motor electrically disabled.

DETAILED DESCRIPTION OF THE INVENTION

Figure 3:
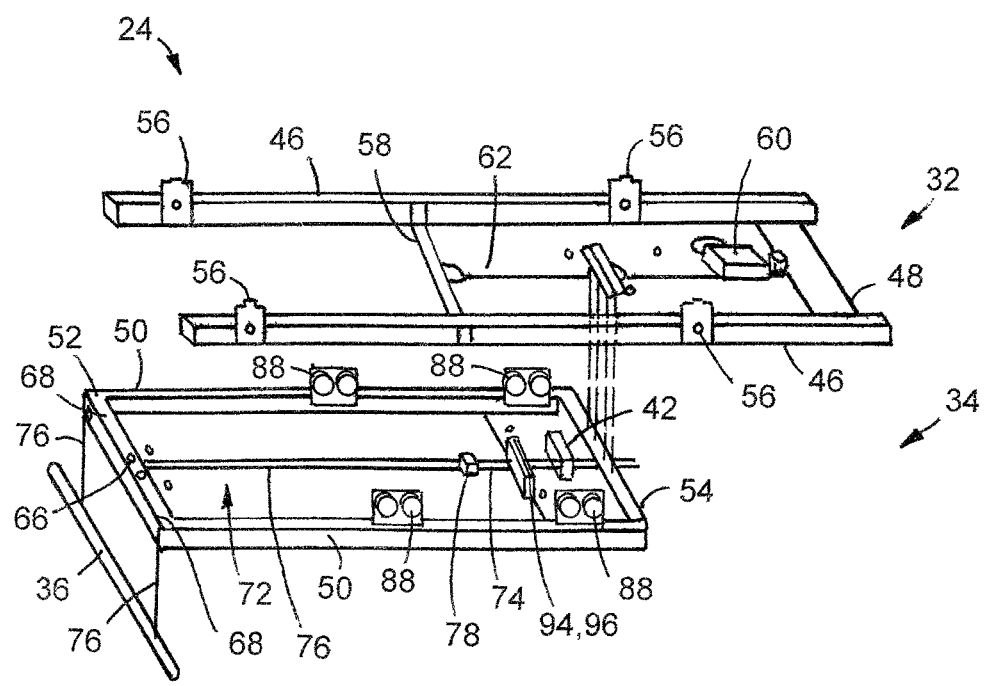
FIG. 3 is a schematic view of the hoist apparatus showing the upper and lower frame elements, disconnected from one another, a drive motor on each frame element, respectively, for driving the lower frame element relative to the upper frame element, and the load bar for loading and unloading cargo.

At the outset it is to be noted that the terms "cargo transport vehicle", "transport vehicle" and "van" are used interchangable and are meant to include open interior vehicle having the structured support member to enable installation of the present assembly.

Turning now to the drawings, FIGS. 1 and 2 illustrate a van or truck 10 having an interior 12 defined by a floor 14, a ceiling or roof 16, and opposite sidewalls 18 and 20. The van or truck is a commercially available vehicle. Illustrative is the Chevrolet Express wherein two rear doors open to access the interior. Disposed in the interior of the van is a support frame 22 that is connected to the van and a hoist apparatus 24 that is connected to the support frame.

In the embodiment shown, the support frame is comprised of several separate U-shaped supports 26 in spaced apart relation, each support including a pair of support legs 28 that are fixedly attached to opposite respective sidewalls 18 and 20 and a cross bar 30 (the "bight" of the support) that extends horizontally between the sidewalls and in close juxtaposed spaced relation with the interior roof 16.

The hoist apparatus 24 is longitudinally extending and extends inwardly from the rearward opening 25 into the van interior and towards the forward end of the van. The hoist apparatus includes an upper frame element 32 fixedly connected to the respective cross bars 30, a lower frame 34 connected for longitudinal movement relative to the upper frame element and between retracted positions entirely in the van and an extended position wherein a forward end thereof is disposed outwardly of the van, and a hoist or load bar 36 connected to the lower frame element for vertical up and down movement relative to the forward end 38 thereof.

FIG. 2 illustrates movement of the lower frame element 34 from a retracted position entirely in the van, and progressive longitudinal movement relative to the upper frame element 32 and into a position outwardly of the van, and vertical movement of the load bar 36 to pick up a load (cargo) L.

As shown in FIG. 2, the width of the load or hoist bar 36 is approximately coextensive with the width of the forward end wall 28 of the lower frame element 34 and is adapted to be disposed in juxtaposed relation thereto. As will be detailed herein, the load or hoist bar is connected by a linkage 72 that retracts or extends and is operably connected to an electric actuator motor 42 at the rearward end wall of the lower frame element 34. Importantly, the hoist bar is sufficiently heavy so as to put a pulling force on the linkage and maintain it taught and prevent sagging when the load bar is retracted.

While shown connected to the sidewalls, for stability, in some installations, the support frame may include e connection to the roof of the van, such as proximate the opposite ends of the hoist apparatus. Also, the frame is preferably secured to the floor of the vehicle such as with bolts 112.

The hoist apparatus 24 is best shown in connection with the schematic of FIG. 3, wherein the upper frame element 32 is generally U-shaped, includes two longitudinally extending side beams 46 of generally square cross-section and a rearward end wall or plate 48, and the lower frame element 34 is generally rectangular shaped, includes two longitudinally extending side beams 50 and forward and rearward end beams or end walls 52 and 54. The upper frame element 32 is connected to the cross-bars 30 of the support frame 22 by a pair of longitudinally spaced brackets 56 on each side beam 46. So connected, the longitudinal beams 46 of the upper frame element 32 are disposed in close juxtaposed relation with the opposite respective sidewalls 18, 20 of the van.

The upper frame element 32 also includes a medial cross bar 58 that is fixedly connected at its opposite ends to the opposite side beams 46, an electric actuator or drive motor 60 on the rearward end wall, and an elongated track beam 62 that extends medially between the side beams 46. The track beam 62 has its opposite ends connected to the motor 60 and the medial cross bar 58, respectively, and has a continuous slit 64 extending longitudinally between its ends along one side.

The lower frame element 34 includes on the forward end wall 52 thereof two first pulleys 66 disposed in side by side relation at the center thereof and two distal second pulleys 68 disposed proximate to a respective longitudinally extending side beam 50 of the lower frame. The electric actuator motor 42 with spool is mounted to the rearward end wall 54 of the lower frame.

A hoist arrangement in accordance with this invention includes a linkage 72 that includes a strap element 74 that wraps around and unwraps from a spool on the motor 42 when selectively actuated and connects to a disabler block 78, and a pair of wires 76 that extend forwardly from their connection at one end to the disabler block, successively wrap around a respective of a pair of first and second pulleys 66 and 68, and extend to their ends and connection with opposite lateral ends of the hoist or load bar 36.

As shown in FIGS. 3, 7, and 8A and 8B, an arrangement is provided for limiting retraction movement of the hoist bar 36, including the disabler block 78. As described later herein, rearward retracting movement of the disabler block in combination with a limit apparatus causes a limit switch to cut power to the electric actuator motor 42 and stop rearward pulling movement on the hoist bar, positioning the hoist bar at the forward end 52 of the lower frame element 34.

The lower frame element 34 is driven relative to the upper frame element 32 by a drive block 80 that is movably mounted atop the track beam 62 and operably associated with a nut that is disposed, in part, in the longitudinal slit along the track beam and operably disposed into threaded connection to a threaded shaft therein. The threaded shaft and nut are conventional and not shown herein. A bracket 82 fixedly connects the drive block 80 to the end wall 54 of the lower frame 34 whereby rotation of the threaded shaft causes axial movement of the nut, which in turn causes the drive block and lower frame element to move. Rotation of the shaft is provided by the electric actuator motor.

The frame elements 32, 34 are connected together, in part, by the bracket 82 that not only maintains the drive block 80 in operable relation with the track beam 62 of the upper frame element 32 but is fixedly secured to the rear end plate of the lower frame element and secures the two frame elements together.

Importantly, driving rotation of the threaded shaft by the motor will cause the bracket and drive block to move along the track beam and simultaneously drive or constrain the lower frame element 34 to move relative to the upper frame element 32.

Preferably, an electrical limit switch is disposed at each end of the track beam to limit movement of the nut and thus the drive block, Engagement by the drive block 80 when reaching either end of the track beam 62 will disable the electric actuator motor 60 associated therewith until re-energized by the user.

Figure 4A:
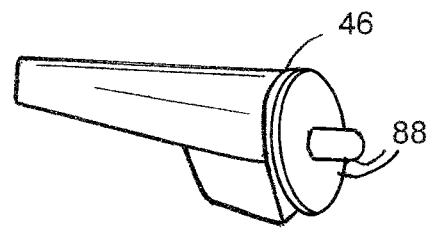
Figure 6:
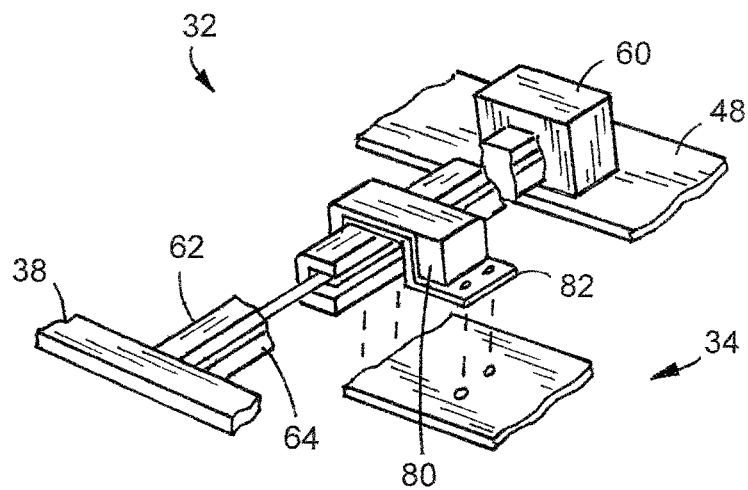
FIG. 6 is a schematic view of the rearward ends of the upper and lower frame elements and the arrangement for driving the lower frame element relative to the upper frame element.
Figure 7:
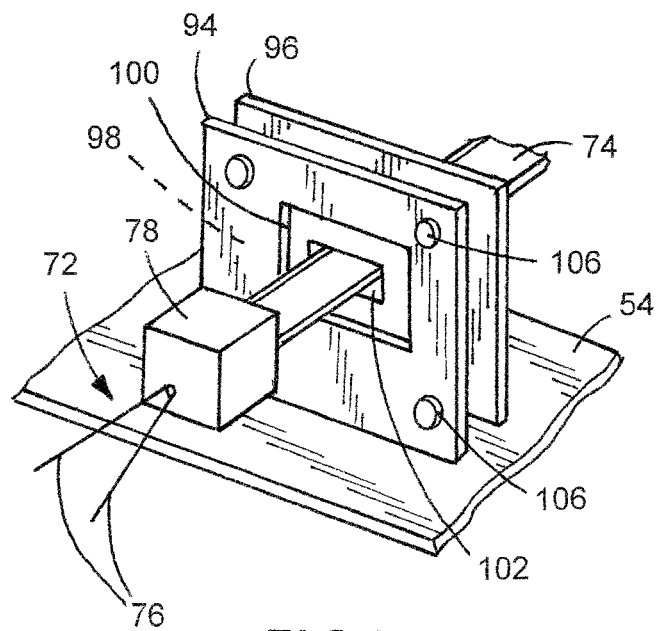
FIG. 7 is a schematic view of an arrangement associated with the lower frame element for limiting retracting movement of the load bar.

FIGS. 4A and 4B are schematic views and show roller assemblies 84 that are used to connect the frame elements and enable rolling movement of the lower frame element relative to the upper frame element. Also shown is the bracket that connects the upper frame element to a cross-bar of the support frame.

A roller assembly 84 comprises a support or mounting plate 86 that is provided with four wheels 88, two wheels on each side of the mounting plate and in side by side relation. The mounting plate is disposed in a longitudinal slit 90 extending along the bottom of a side beam 46 of the upper frame element 32 for sliding motion therewithin and the pairs of rollers are supported for rolling on and along the lower support webs or feet 92 that define the slit 90 of the side beam 46. The bottom of the mounting plate 86 is fixedly mounted to a respective side beam 50 of the lower frame element 34 such as by nuts and bolts.

Preferably, two roller assemblies 84 support each side beam 50 of the lower frame element 34 to a respective side beam 46 of the upper frame element 46, one roller assembly towards the forward end and the other roller assembly towards the rearward end of the lower frame element.

Desirably, the spaced placement of four roller assemblies in the side beams 50 assures smooth rolling and the spaced apart sets of roller assemblies resist adverse pivoting torque moments that might act on the connection when the hoist bar 36 is lifting/lowering heavy cargo.

Connection of the hoist or load bar 36 to the lower frame element 34 is shown best in the schematic of FIG. 5, and includes the two sets of pulleys 66 and 68, the two wires 76 of the linkage 72 that wrap around the pulleys and connect to the hoist bar 36 at one respective end and connect to a disabler block 78 at the other end. The view is looking at the bottom side of the frame element and thus the hoist bar movement to extend or retract is as noted.

Also shown in FIG. 5 is a bracket 56 that connects the upper frame element 32 of the hoist apparatus to a cross-bar 32 of the support frame 22. The bracket 56 almost completely encircles the side beam 46 and provides support to the feet or support walls 92 to prevent downward deflection possibly caused by heavy loads being brought into the van by the lower frame element.

The arrangement provided for limiting retraction movement of the hoist bar 36 comprises forward and rearward rectangular shaped limit plates 94 and 96 disposed in parallel juxtaposed relation on the rearward end 54 of the lower frame element 34 and a limit switch 96 is provided and in operable electrical connection with the motor 42. In the embodiment shown, the limit switch 98 is disposed on the forward limit plate 94 in faced relation with the movable rearward limit plate 96. The limit plates are disposed such that the rearward limit plate 96 is mounted to and biased towards the forward limit plate 94 in a manner that the rearward limit plate 96 can be moved away from the forward limit plate 94 and towards the motor 42.

The forward limit plate 94 is distal to the motor and fixedly secured to the lower frame 34 and includes a central opening 100 suitably sized to allow the disabler block 78 to pass, at least in part. As shown, the central opening 100 is rectangular in shape and the disabler block 78 is cubical in shape and complementary to the central opening. The disabler block 78 and opening 100 may be otherwise, such as with a circular opening sized to pass a spherical ball-shaped disabler.

The rearward limit plate 96 is proximate to the motor 42 and includes an opening 102 sized to allow the strap to pass to the winding spool on the motor 42.

In the embodiment shown, four elongated rods 104, each having respective forward and rearward ends, connect the plates together. The forward ends of the rods are fixedly connected to the forward plate 94, as shown by nuts 106. The opposite forward ends of the rods extend through the plates and toward the motor and are terminated by a nut 106 threadably secured thereto. The rods are dimensioned as to have an end portion that extends away from and between the rearward limit plate 96 and the nut 108. These rearward end portions of the rods are provided with a compression spring 110 that is disposed between the nut 108 and rearward limit plate 96.

Desirably, the springs 110 cooperate to provide a uniform compression force that biases the rearward plate 96 towards the forward plate 94 and into engagement with the limit switch 98 disposed on the forward limit plate 94. In this regard, the nuts 108 may be advanced on their roads whereby the compression force provided by the springs may be adjusted.

Importantly, the limit switch when engaged by the rearward plate completes an electrical circuit between the limit switch and the motor that enables the motor to drive the winding spool associated therewith and move the wires/strap. When the limit switch is not engaged by the rearward plate, electricity to the motor is turned off, leaving the load bar positioned proximate to the forward end of the lower frame.

Referring to FIG. 8B, upon retracting movement, the motor 42 draws the strap 74 rearwardly and onto the spool, causing the disabler block 78 to be pulled through the central opening 98 and against the rearward limit plate 96, causing the rearward plate to back off from contact with the limit switch 98 and the electrical circuit terminated. Plate movement from the switch is shown by the letter "x". The hoist bar 36 is at this point positioned at the forward end 52 on the lower frame element 34 and due to the weight thereof gravity pulls on the linkage 72 and causes the wires and the strap to be taut.

While the limit switch is shown associated with the fixed forward plate, it could other, such as on the movable limit plate, and biased therewith into in engagement with the fixed forward plate and completing an electrical circuit with the motor.

In operation, the user may use a wireless transmitter to control either of the electric motors or actuators or employ a hand operated controller mounted appropriately in the truck interior. In this regard, a conventional power source or battery would be in the cargo interior. The electric actuator motors and limit switches described herein are commonly available and off-the-shelf.

Having thus, described the invention, what is claimed is:

1. A weight transfer apparatus for use in combination with a cargo transport vehicle, the vehicle having inner walls and a support structure, the support structure being fixedly attached to the inner walls of the vehicle, the weight transfer apparatus comprising:
   (a) a pair of longitudinally extending first beams connected to the support structure;
   (b) a rectangular-shaped frame member having a forward end and a rearward end and including a pair of longitudinally extending second beams;
   (c) means for moving the frame member between a retracted position within the vehicle and an extended position outwardly of the vehicle, the means for moving including a reversible motor;
   (d) a vertically movable and horizontally translatable hoist bar connected to the frame member; and
   (e) a linkage for moving the hoist bar in opposite vertical directions, the movement of the hoist bar being raised and lowered relative to the frame member;
   (f) limit means comprising:
      first and second spaced-apart plates in facing relationship, and an electrical limit switch disposed between and mounted to one of the plates and electrically connected to the motor, the first plate being fixed to an end wall of the frame member and distal to the motor, the second plate being mounted for movement toward and away from the first plate, means for normally biasing the second plate toward the first plate and the switch into engagement with the first plate and wherein the motor operates when the switch is engaged then disabled when the switch is not engaged.

2. The weight transfer apparatus of claim 1, further including a load bar and a disabler block, the disabler block connected to the linkage and wherein a retracting rearward pull by the motor on the linkage moves the disabler block rearward into engagement with the second plate, driving the second plate from the first plate into engagement with the switch and causing the motor to turn off the load bar and to stop at the rearward end of the frame.

3. In combination:
   (a) a cargo transport vehicle, the vehicle having inner walls and a support structure, the support structure being fixedly attached to the inner walls of the vehicle, and
   (b) a weight transfer apparatus, the weight transfer apparatus comprising:
      (1) a pair of longitudinally extending first beams connected to the support structure;
      (2) a rectangular-shaped frame member including a pair of longitudinally extending second beams;
      (3) means for moving the frame member between a retracted position within the vehicle and an extended position extending outwardly of the vehicle the means for moving including a motor;
      (4) a horizontally and vertically movable hoist bar, the hoist bar being horizontally translatable between an extended position and a rearward retracted position;
      (5) a linkage for moving the hoist bar in opposite vertical directions, the movement of the hoist bar being raised and lowered relative to the frame member; and (6) limit means for limiting the rearward retraction of the hoist bar and including first and second spaced-apart plates in facing relationship, and an electrical limit switch disposed between and mounted to one of the plates and electrically connected to the motor, the first plate being fixed to an end wall of the frame member and distal to the motor, the second plate being mounted for movement toward and away from the first plate, means for normally biasing the second plate toward the first plate and the switch into engagement with the first plate and wherein the motor operates when the switch is engaged then disabled when the switch is not engaged.

4. The combination of claim 3, further including a load bar and a disabler block, and wherein the disabler block is connected to the linkage and wherein a retracting rearward pull by the motor on the linkage moves the disabler block rearward into engagement with the second plate, driving the second plate from the first plate into engagement with the switch and causing the motor to turn off the load bar and to stop at the rearward end of the frame.

* * * * *